United States Patent Office 2,841,526
Patented July 1, 1958

2,841,526

FATTY ACID-RESIN ADSORPTION PRODUCT

Edwin L. Gustus, Chicago, Ill., assignor to R. J. Strasenburgh Co., Rochester, N. Y., a corporation of New York No Drawing. Application June 4, 1956
Serial No. 588,996

2 Claims. (Cl. 167—55)

The invention relates to fatty acid-resin adsorption products that are particularly useful in the treatment of infections of the alimentary canal by micro-organisms, especially by the Monilia known as *Candida albicans*.

The fatty acid-resin adsorption products of this invention are also useful for making fungus resistant wrappings.

Intestinal infections from *Candida albicans* have become quite common since the introduction into medicine of orally administered antibiotic preparations, such as aureomycin, chloramphenicol, terramycin, and the like. These antibiotic agents may modify or destroy the normay protective bacterial flora of the intestinal canal and thereby permit the invasion of this region by organisms relatively insensitive to the action of the antibiotic drug and which had been previously prevented from becoming established in this location by the presence there of the normally occurring organisms. Although infections of the mucous membranes of the mouth and vagina and of the skin and nails by *Candida albicans* have been well known for many years and topical treatment methods have been developed to eradicate such infections in these accessible locations, there is great need of an effective treatment agent for preventing and for eradicating infections of the alimentary canal by *Candida albicans*.

Although the symptoms of intestinal infection by *Candida albicans* are most often disagreeable rather than serious, and although the majority of such infections clear up spontaneously in a shorter or longer period of time after stopping the administration of the antibiotic drugs, a certain percentage of cases require weeks or months to disappear spontaneously, and in some cases the infection does not spontaneously disappear and may finally reach the blood stream and spinal fluid with fataly results. Further, such symptoms may tend to force the too early discontinuance of the antibiotic drug, and the possibility of such symptoms may deter the use of such antibiotic drugs in patients known to be exceedingly sensitive to infections by *Candida albicans*.

Certain fatty acids and salts of these fatty acids have been used in the topical treatment of *Candida albicans* infections of the skin and nails and of externally accessible areas of mucous membranes. They have not had any extensive use for the treatment of internal intestinal infections largely because of the irritating effect of the fatty acids whether given as such or given as salts which would be readily and rapidly converted to the free acids by the hydrochloric acid of the stomach. Since diarrhea is a frequent symptom of *Candida albicans* infection of the intestinal tract, the use of drugs capable of an irritant action in dosages effective against the infection must be avoided. This has ruled out the use of free fatty acids and of their water soluble salts, as well as the use of those sparingly soluble salts of fatty acids which may be rapidly converted to free fatty acids by the hydrochloric acid of the stomach, for example, the calcium salts of fatty acids.

Further, the *Candida albicans* organisms which are in the fecal mass are shortly eliminated from the body through defecation, and it is not necessary to use amounts of treatment agents sufficient to kill these organisms, provided a means of combating the growth of the organisms on the mucous membranes of the intestinal wall is at hand, and provided topical treatment of any such infections which may be existing in the mouth is undertaken to prevent their continually reinfecting the intestinal areas. A sparingly soluble, therapeutically effective, non-toxic material, practically insoluble in the acid juices of the stomach and in the fluids present in the intestinal canal, which is not adsorbable from the intestines into the body and which is devoid of irritating or laxative action in effective dosages, is a highly desirable addition to the physician's armamentarium.

Another object of this invention is to provide a fungus resistant composition which can be incorporated into paper pulp or coated on paper to give a fungus resistant wrapping which has the advantage over ordinary fatty acids in giving a dry and permanent impregnation or coating.

These and other objects and advantages are accomplished by adsorbing certain fatty acids to insoluble acid-adsorbing or anion exchange resins. Suitable fatty acids for this purpose are the saturated fatty acids containing from 7 through 9 carbon atoms. The unsaturated fatty acids containing from 6 through 11 carbon atoms are also highly satisfactory, but to avoid excessive toxicity these fatty acids should be free of triple bonds. The fatty acid complexes are in general more effective in alkaline medium than in acid so that some of the fatty acid complexes which show relatively poor results in the following table are suitable and effective when adsorbed on the resin and used in the treatment of micro-organisms present in the lower portion of the small intestine and in the large intestine. However, those fatty acid complexes which are effective in acid medium are effective also in alkaline environment as well as in acid environment such as in the stomach and upper portion of the duodenum.

The following Table 1 shows the results of growth inhibition studies on *Candida albicans* in Sabouraud's medium.

TABLE 1

| Name of Fatty Acid in Complex | No. of carbon atoms in fatty acid | Examination of Petri dish cultures *Candida albicans* on Sabouraud's agar medium at pH 5.6 and 27.5° C. | | | |
|---|---|---|---|---|---|
| | | After 24 hrs. | After 48 hrs. | After 72 hrs. | After 96 hrs. |
| Propionic | 3 | — | — | — | — |
| Butyric | 4 | — | — | — | — |
| Valeric | 5 | — | +— | +— | +— |
| Caproic | 6 | — | ++ | ++ | ++ |
| 2,4-Hexadienoic | 6 | +++ | ++++ | ++++ | ++++ |
| Heptylic | 7 | ++ | +++ | ++++ | ++++ |
| Caprylic | 8 | ++++ | ++++ | ++++ | ++++ |
| Pelargonic | 9 | ++ | +++ | +++ | +++ |
| Caproc | 10 | +— | +— | +— | +— |
| Undecanoic | 11 | — | — | — | — |
| Undecylenic | 11 | ++ | ++ | ++ | ++ |
| Lauric | 12 | — | — | — | — |

Explanation of symbols:
— Indicates no detectable inhibition of growth on portion of plate lightly dusted with powdered resin complex of the fatty acid compared with growth on non-dusted portion of plate.
+— Faintest detectable inhibition of growth.
+ Inhibition of growth, definitely detectable.
++ Fair inhibition of growth.
+++ Good inhibition of growth (no growth on dusted area and for short distance beyond).
++++ Excellent inhibition of growth (no growth on dusted areas and for some distance beyond that area).

The following Table 2 gives a comparison between several complexes in alkaline Sabouraud's medium.

TABLE 2

[Growth inhibition studies—Sabouraud's medium adjusted to pH 7.5—
Candida albicans. Examination of Petri dish cultures.]

| Name of Fatty Acid in Complex | No. of carbon atoms in fatty acid | After 24 hrs., 27.5° C. | After 48 hrs., 27.5° C. | After 72 hrs., 27.5° C. | After 96 hrs., 27.5° C. |
|---|---|---|---|---|---|
| Caprylic Acid | 8 | ++++ | ++++ | ++++ | |
| Undecylenic Acid | 11 | ++ | ++ | ++ | |
| Lauric | 12 | − | − | − | |
| Tridecylic | 13 | − | − | − | |

Explanation of symbols—the same as that in Table 1 in column 2.

These fatty acid-resin complexes or adsorption compounds are practically insoluble in water and in the fluids of the stomach and the intestinal canal, and they are not absorbable from the intestines into the body. As a result, they tend to become temporarily accumulated and deposited on the intestinal wall though they are present to some extent throughout the fecal mass. They slowly liberate small amounts of fatty acids by hydrolysis and by ion exchange and in this manner they inhibit the growth of organisms sensitive to these fatty acids and ultimately bring about the destruction of these organisms. Their action is usually much greater against fungi than it is against bacteria, and they do not tend significantly to destroy the normal bacterial flora of the intestinal tract. They are therefore ideal materials for eradicating the infections of the intestinal tract resulting from fungi, the most common offender being Candida albicans.

The resin adsorption products of this invention are made by contacting a water insoluble acid adsorbing resin (commonly called an anion exchange resin) with the desired fatty acid. The preferred product is obtained by reacting a weak base acid adsorbing resin, such as a polyamine resin having one or more of the following group types: primary, secondary and tertiary amino groups; with the fatty acid. This reaction may be represented as follows:

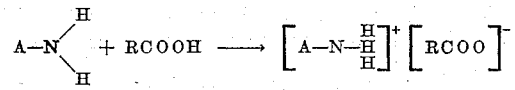

where RCOOH represents the fatty acid. While fatty acid is adsorbed on the resin in this manner and is strongly bound so that it is not readily removed by solvents such as acetone, there is also some fatty acid adsorbed to the resin less strongly in that it is removable by acetone treatment. These weak base adsorption products are stable, have no objectionable odor, and have no deleterious effect on the patient.

Another form of adsorption product or complex which is unstable, has an objectionable odor and tends to induce gas formation when administered to the patient, is the quaternary ammonium resin salt of a fatty acid obtained by reacting a strong base acid adsorbing resin, such as a quarternary ammonium anion exchange resin. This reaction may be represented as follows:

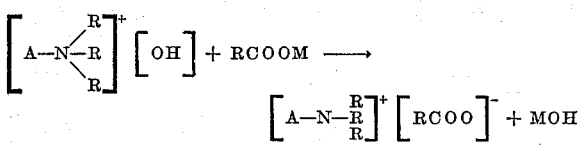

In the above equations (A) represents a resin nucleus such as a water insoluble phenol-aldehyde or phenol-ketone condensation product having amino or imino or tertiary amino groups represented by —NH₂, —NHR, NR′R″ where R represents an aliphatic, alicyclic, aromatic or alkaryl residue and M represents a metal or ammonium ion.

The preferred adsorption compounds for the treatment of Monilia are the weak base anion exchange resins having adsorbed thereon an anion of a suitable fatty acid such as caprylic acid, the resin being substantially saturated as to fatty acid but not saturated as to hydrochloric acid.

Another form of complex or adsorption compound results from the use of anion exchange resins which have been treated with a dilute solution of a soluble aluminum salt such as, for example, aluminum sulfate. Such products are disclosed in U. S. Patent 2,373,632 and are included in the term "water insoluble acid adsorbing resin."

The term "water insoluble acid adsorbing resin" as used in this specification is to be understood as including what are commonly called anion exchange resins, thus covering resins containing no attached anion, those in free base form, and those which contain an anion of a weak acid. Acid adsorbing resins which can be utilized in the present invention are numerous and include those resins in which the acid adsorption or acid neutralization depends upon, for example, the presence in the resin of one or more of the following group structures: aromatic or aliphatic primary, secondary or tertiary amino groups, or the quaternary ammonium group structures. They can be amine aldehyde or amine ketone condensation products. Such amine resins are referred to in this specification as polyamine acid adsorbing resins. One type of acid adsorbing resin which has given satisfactory results is sold by Rohm and Haas Co. under the trade name "XE-58." This is a weak base polyamine anion exchange resin. More particularly it is a polyethylene polyamine methylene substituted resin of diphenylol dimethyl methane and formaldehyde. The polyamine acid adsorbing resins disclosed in U. S. Patent 2,402,384 have also been highly satisfactory.

In addition to the particular type of polyamine aldehyde resin used in the examples cited here, other water insoluble acid adsorbing resins can be used provided, of course, that they have sufficient adsorbing capacity for the carboxylic acids used in preparing the compositions of this invention and are physiologically innocuous. For example, a meta-phenylene diamine-formaldehyde acid adsorbing resin could have been used although its adsorbing capacity is somewhat lower than that of the resin given in the examples. Still other acid adsorbing resins can be employed, such as acid adsorbing resins prepared from amines and polysaccharides, ethanolamine alkyd resins, alkylated aromatic diamines, and aromatic diamines both unmodified and modified by incorporating into the resin molecular structure during preparation alkyl groups to form quaternary ammonium bases. Also amine resins co-condensed with aliphatic polyamines or with polyimines can be used, or amine resins treated during preparation with cyanamide or with dicyandiamide, thus introducing the strongly basic guanidino group. Acid adsorbing resins prepared by reacting aliphatic polyamines with polyhalogen derivatives of hydrocarbons can be used, as well as acid adsorbing modified phenolic resins. In all cases, the resin should be physiologically innocuous or inert and should be sparingly soluble or insoluble in water and in dilute acids or bases.

A simple method of preparation of the desired products is to stir or shake the moistened resin in base form with water and the desired fatty acid until no more fatty acid is adsorbed. The solid product is then filtered off and washed with water and dried. The amount of fatty acid adsorbed will depend on the proportions of resin and of fatty acids used, and the amount of water used is not critical so long as enough of it is present to make possible the easy agitation and mixing of the reactants.

An alternate procedure is to shake or stir the wetted, powdered resin in base form with an alcoholic solution of the fatty acid and while agitating to add water until the adsorption of the fatty acid by the resin is complete.

For internal therapeutic use and also preferably for paper impregnation and coatings the resin complex is in powder form of particle size preferably such that substantially all of the particles will pass through an 80 mesh screen (U. S. standard). Finer particles may be used such as 200 mesh particles. In order to provide a resin complex having particles within these sizes there are used anion exchange resins in powdered form having a particle size of 200 mesh or finer. Such products may be obtained by grinding commercial anion exchange resins, such as 50 mesh resins, to size, or of course the complex itself can be ground to size.

These 80 mesh or finer particle size adsorption compounds are superior to ordinary larger size such as 50 mesh particle size in leaving a greater residuum along the mucosal folds of the intestinal tract as normal physiological processes take place.

Examples of the preparation of the product will make the procedures clear.

EXAMPLE I

*Preparation of saturated complex of a polyamine acid-adsorbing resin and caprylic acid without the use of organic solvents*

50 grams of a finely powdered (200 mesh, U. S. standard screen) polyamine acid-adsorbing resin in base form ("XE-58" resin of Rohm and Haas Co.—a polyethylene polyamine methylene substituted resin of diphenylol dimethyl methane and formaldehyde)
80 grams of caprylic acid
100 grams de-ionized water The 50 grams of resin and the 100 grams of de-ionized water are placed in a container, preferably of glass or of stainless steel. The container is agitated for one-half to one hour to permit the resin to become thoroughly wetted and saturated with water. The container is then opened and 80 grams of caprylic acid added, the container closed and returned to the agitator. It is vigorously agitated for several hours or overnight. The container is then opened and the contents collected on a suction funnel, washed well with warm de-ionized water to remove traces of unadsorbed caprylic acid, sucked down well, and dried in air at room temperature and finally at 50° C. The product weighs 120.14 grams and contains 58.38% of caprylic acid by weight. It is still capable of adsorbing a substantial amount of hydrochloric acid.

EXAMPLE II

*Preparation of saturated complex of a polyamine acid-adsorbing resin and undecylenic acid using organic solvent*

386 grams of dry "XE-58" resin (Rohm and Haas Co.) powdered, and in free base form
219 grams undecylenic acid C. P.
955 ml. isopropyl alcohol containing 10% water
360 ml. de-ionized water The dry resin powder is stirred up with de-ionized water to make a slurry and is allowed to stand for one-half to one hour to wet it thoroughly. The suspension is filtered off by suction and drained well. The damp resin cake is transferred to a glass or stainless steel container and 219 grams of undecylenic acid (10-hendecenoic acid) dissolved in 955 ml. of 90% isopropyl alcohol is added rapidly with stirring. Then 360 ml. of de-ionized water is added in a slow stream over one hour while stirring is continued, and the resulting mixture is stirred for several hours or overnight to complete the saturating of the resin. The product is filtered off by suction and the resin complex cake is washed with a small amount of 60% isopropyl alcohol, sucked down well and dried in air at room temperature and finally at 50° C. The product weighs 233 grams and contains 31% of undecylenic acid. It was ground to a particle size such that substantially all of it passed through a 80 to 200, or finer, mesh screen (U. S. standard).

EXAMPLE III

*Preparation of a saturated complex of a polyamine acid-adsorbing resin and capric acid using organic solvent*

16 grams "XE-58" resin (Rohm & Haas Co.) dry and in finely powdered free base form, such that all the resin passed through a 200 mesh screen
9 grams capric acid
55 ml. 90% isopropyl alcohol (10% water)
20 ml. de-ionized water The resin is soaked in an excess of de-ionized water for one-half to one hour until it is thoroughly saturated with water. It is collected by suction on a funnel and the damp resin cake transferred to a suitable container, preferably of glass or of stainless steel. Now 9 grams of capric acid dissolved in 55 ml. of 90% isopropyl alcohol is added with stirring and while continuing the stirring 20 ml. of de-ionized water is added dropwise during 30–60 minutes. The stirring is then continued for several hours or overnight and the saturated resin complex is collected on a suction funnel, sucked down well, washed with de-ionized water, then with an amount of acetone equal to one-half the volume of the cake. The product is dried in air at room temperature and finally at 50° C. in air. The dried product weighs 22.21 grams and contains 29.8% of capric acid.

The isopropyl alcohol used in the above preparations can be replaced by other water miscible solvents such as ethyl alcohol, dioxane, etc., which are solvents for the fatty acids, and not themselves acids.

EXAMPLE IV

*Preparation of saturated complex of sorbic acid (2,4-hexadienoic acid) and "XE-58" acid adsorbing resin*

50 grams of "XE-58" acid adsorbing resin, base form, as 200 mesh powder. Moisture (50° C.)=0.65%
24.5 grams crystalline sorbic acid C. P.
4500 ml. de-ionized water The above three materials are placed in a 5 liter round bottom flask and the contents are stirred and warmed to 45° C. overnight. Next day, after allowing to cool to room temperature, the contents of the flask are filtered and the faintly acid mother liquor is removed from the cake by suction. The cake is now washed four successive times using suction and amount of de-ionized water at 50° C. equal to the volume occupied by the cake. The washed and drained cake is broken up, dried in air at room temperature and then at 50° C. The product weighs 70.51 grams and contains 29.5% of sorbic acid.

In the treatment of monilial infection of the intestinal tract the resin complex of the fatty acid is given as a powder in a capsule or in a tablet either as the adsorption compound itself or mixed with a pharmaceutical carrier. The minimum effective unit dosage in capsule or tablet form is about 75 milligrams of a polyamine anion exchange resin in which the amine groups are selected from the groups consisting of primary, secondary and tertiary amine groups, and having adsorbed thereon above approximately 30% by weight of the adsorption product of a fatty acid selected from the group consisting of saturated fatty acids containing from 7 to 9 carbon atoms, and unsaturated double bond fatty acids containing from 6 to 11 carbon atoms. There is no maximum unit dosage which is toxic although one would not ordinarily take more than 5 grams at once. Highly satisfactory results are obtained by giving the resin adsorption compound of this invention in capsule form in a daily dosage of 12–16 capsules per day, each capsule containing 250 mg. of the powdered resin fatty acid adsorption compound with or without admixture of any pharmaceutical diluant as may be dictated by the size of the capsule. The medicament is given one to three capsules at a time at intervals throughout the day and is continued until the stools fail to show *Candida albicans* when an examination is made for this organism by appropriate laboratory procedures. If it is desired to prevent the establishment of a monilial infection during oral antibiotic therapy the capsules are given during the course of antibiotic therapy and their use is continued for a few days after such therapy has been completed. The dosage is the same as indicated for the treatment of monilial infection of the intestinal tract, suitably a total of 12 to 14 capsules each containing approximately 75 to 250 mg. of the saturated complex of resin with fatty acid. The resin complexes of caprylic acid and of undecylenic acid (10:hendecenoic acid) appear to give the best results, but complexes of heptylic acid and of pelargonic acid are also very effective.

Although the amount of fatty acid adsorbed to the resin in the preparative procedures described varies, depending on the conditions employed and especially on the ratio of fatty acid to acid adsorbing resin, it has been found that preparations of caprylic acid and of undecylenic acid adsorbed to the weak base acid adsorbing resins in which the content of fatty acid in the dried final product amounted to 30% to 55% are quite satisfactory therapeutically. Products containing a greater proportion of fatty acids can be prepared by increasing the ratio of fatty acid to resin, and by this means products containing approximately 68% of fatty acid are possible especially if prepared under conditions where a significant amount of excess, unadsorbed fatty acid remains in the liquid medium. However, with strong base or quaternary ammonium resins only 20% fatty acid adsorption could be obtained and when the strong base resins was in chloride form even less adsorption (about 18%) was possible than when a free base form.

The final dried products are pulverizable solids even in those cases where the fatty acid employed is one which is liquid at room temperatures. A mixture of a liquid fatty acid with a powdered insoluble resin, not of the acid-adsorbing type, containing a proportion of liquid fatty acid to resin of this magnitude, is an oily paste rather than a pulverizable solid. The products prepared thus are not simply mixtures of resin and fatty acids but are true adsorption complexes or compounds.

Although there have been described products prepared by absorbing pure individual fatty acids to the acid-adsorbing resins, very satisfactory products for therapeutic use can be prepared by employing a mixture of appropriate fatty acids. For example, a mixture of heptylic, caprylic, pelargonic and capric acids can be used as the fatty acid component in the preparation and the resulting saturated complex will contain a mixture of these fatty acids, all of which are effective therapeutically. Thus, it is not necessary to use a highly purified single fatty acid in the manufacture of a therapeutically effective product. A fatty acid fraction embracing more than one appropriate fatty acid is usually less expensive and more readily available.

The compositions of this invention can be used as such, which is in substantially moisture-free form, or they can be intermixed with other pharmaceutically compatible ingredients or excipients. For example, it may be desired to give it in capsules, pills, tablets or as a powder, or even in syrups, elixirs, or emulsions. They can be intermixed with flavoring and coloring materials, clay, bentonite, antacids such as magnesium or aluminum oxide, aluminum phosphates, basic aluminum amino acetate and analogues and the like or bismuth suboxide, or bismuth or zirconium subcarbonates, emollients such as methyl cellulose, gastric mucin, carboxy methyl cellulose, sodium carboxy methyl cellulose, sulfated gluten and the like, or with naturally occurring gums and mucilages, gelatin, amino acids and their salts, peptones, peptides, or with any other ingredients cooperative therewith or not incompatible therewith including an anion exchange resin without adsorbed fatty acid.

Particularly useful compositions comprise the fatty acid-anion exchange complex of this invention mixed with an antibiotic such as neomycin and preferably also some gelatinous material such as sodium alginate. A suitable composition consisted of .084 gram of XE-58 caprylate, .168 gram of neomycin, and 1 gram of sodium alginate.

This application is a continuation-in-part of Gustus application on Therapeutic Fatty Acid-Resin Adsorption Product, Ser. No. 238,592, filed July 25, 1951, abandoned February 9, 1954, and of Gustus application on Fatty Acid-Resin Adsorption Product, Ser. No. 401,389, filed December 30, 1953, now abandoned.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A composition for treating Moniliasis, said composition being in dosage unit form comprising a minimum of approximately 75 mgs. and a maximum of approximately 5 grams per dosage unit of a polyamine anion exchange resin in which the amine groups are selected from the groups consisting of primary, secondary and tertiary amine groups, and having adsorbed thereon a fatty acid selected from the group consisting of saturated fatty acids containing from 7 to 9 carbon atoms and unsaturated double bond fatty acids containing from 6 to 11 carbon atoms.

2. A method of combating Monoiliasis which comprises orally administering to a human host infected with monilia a composition in dosage unit form comprising a minimum of approximately 75 mgs. and a maximum of approximately 5 grams of a polyamine anion exchange resin in which the amine groups are selected from the groups consisting of primary, secondary and tertiary amine groups, and having adsorbed thereon a fatty acid selected from the group consisting of saturated fatty acids containing from 7 to 9 carbon atoms and unsaturated double bond fatty acids containing from 6 to 11 carbon atoms, and continuing said dosage at intervals until the monilia are destroyed.

References Cited in the file of this patent

UNITED STATES PATENTS

| | | |
|---|---|---|
| 2,466,663 | Russ | Apr. 5, 1949 |
| 2,550,489 | Martin | Apr. 24, 1951 |
| 2,554,072 | Sullivan | May 22, 1951 |

OTHER REFERENCES

"Acid Adsorption and Separation by Means of Amberlite IR-4B" (1946), pp. 1–5, Rohm and Haas Co., Wash. Sq., Philadelphia, Pa.

"Adsorption of Organic Acids by Amberlite IRA-400" (1949), Rohm and Haas, pp. 1–3.